(12) United States Patent
Hirst Dowson et al.

(10) Patent No.: US 9,349,184 B2
(45) Date of Patent: May 24, 2016

(54) METHOD AND APPARATUS FOR IDENTIFYING REGIONS OF INTEREST IN A MEDICAL IMAGE

(75) Inventors: Nicholas Delanie Hirst Dowson, Queensland (AU); Thomas George Wright, Oxford (GB); Timor Kadir, Oxford (GB); Kevin Scott Hakl, Oxford (GB)

(73) Assignee: Siemens Medical Solutions USA, Inc., Malvern, PA (US)

( * ) Notice: Subject to any disclaimer, the term of this patent is extended or adjusted under 35 U.S.C. 154(b) by 1254 days.

(21) Appl. No.: 12/554,356

(22) Filed: Sep. 4, 2009

(65) Prior Publication Data

US 2010/0088644 A1 Apr. 8, 2010

(30) Foreign Application Priority Data

Sep. 5, 2008 (GB) .................................. 0816173.9
Sep. 5, 2008 (GB) .................................. 0816177.0
Sep. 5, 2008 (GB) .................................. 0816187.9

(51) Int. Cl.
*G06K 9/00* (2006.01)
*G06T 7/00* (2006.01)
*G06K 9/32* (2006.01)
*G06K 9/36* (2006.01)

(52) U.S. Cl.
CPC ............ *G06T 7/0081* (2013.01); *G06K 9/3233* (2013.01); *G06T 7/0091* (2013.01); *G06K 2009/366* (2013.01); *G06K 2209/053* (2013.01); *G06T 2207/10104* (2013.01); *G06T 2207/20101* (2013.01); *G06T 2207/30096* (2013.01)

(58) Field of Classification Search
CPC .................................................... G06T 7/0012
USPC ........................................................ 382/128
See application file for complete search history.

(56) References Cited

U.S. PATENT DOCUMENTS

| | | | |
|---|---|---|---|
| 5,896,463 A | 4/1999 | Kuhn | |
| 6,246,784 B1 | 6/2001 | Summers et al. | |
| 7,236,558 B2 * | 6/2007 | Saito | G06T 11/008 378/4 |
| 7,529,397 B2 * | 5/2009 | Wang | G06K 9/00127 382/128 |
| 7,574,029 B2 * | 8/2009 | Peterson | G06K 9/4638 382/130 |
| 8,050,481 B2 * | 11/2011 | Reeves | G06T 3/0075 382/128 |

(Continued)

FOREIGN PATENT DOCUMENTS

WO WO 03/003303 A2 1/2003

OTHER PUBLICATIONS

Matas et al. "Robust Wide Baseline Stereo from Macimally Stable Extremal Regions," Proc. of British Machine Vision Conference (2002).

(Continued)

*Primary Examiner* — Robert Sorey
(74) *Attorney, Agent, or Firm* — Schiff Hardin LLP (57) ABSTRACT

In a method and apparatus for identifying regions of interest in medical images of a subject, in particular images captured by a medical imaging apparatus, such as a PET scanner, a list of voxels of the image is obtained, and sorted according to a first variable. A user-selection of an initial voxel in the image is then registered, and at least one voxel or group of voxels from the sorted list is selected as a region of interest, according to a property of the at least one voxel or group in relation to the user-selected initial voxel. The image may be preprocessed to generate the sorted list of voxels, following which the user selection of the initial voxel is registered.

9 Claims, 8 Drawing Sheets

(56) References Cited

U.S. PATENT DOCUMENTS

| | | | |
|---|---|---|---|
| 8,131,075 B2* | 3/2012 | Sun | G06K 9/342 382/128 |
| 2003/0174883 A1* | 9/2003 | Krishnan | H04N 19/64 382/166 |
| 2003/0194119 A1 | 10/2003 | Manjeshwar et al. | |
| 2005/0007115 A1* | 1/2005 | Cline | G01R 33/56563 324/309 |
| 2005/0017972 A1 | 1/2005 | Poole et al. | |
| 2005/0110791 A1* | 5/2005 | Krishnamoorthy | G06T 7/0083 345/419 |
| 2005/0110795 A1* | 5/2005 | Sheffield | G01V 1/32 345/581 |
| 2005/0157925 A1* | 7/2005 | Lorenz | 382/173 |
| 2005/0271278 A1* | 12/2005 | Liang et al. | 382/195 |
| 2006/0209063 A1* | 9/2006 | Liang | G06K 9/342 345/419 |
| 2007/0008317 A1* | 1/2007 | Lundstrom | G06T 15/08 345/424 |
| 2007/0036406 A1* | 2/2007 | Bogoni | G06T 7/0081 382/128 |
| 2007/0081712 A1* | 4/2007 | Huang | G06T 7/0028 382/128 |
| 2007/0116346 A1 | 5/2007 | Peterson et al. | |
| 2007/0127794 A1 | 6/2007 | Niogi et al. | |
| 2007/0165920 A1* | 7/2007 | Gering | A61B 5/055 382/128 |
| 2007/0165926 A1* | 7/2007 | Paulus | G06T 7/0012 382/128 |
| 2007/0200873 A1* | 8/2007 | Hsu | 345/629 |
| 2008/0089576 A1* | 4/2008 | Bushell | G06K 9/2018 382/154 |
| 2008/0117209 A1* | 5/2008 | Razeto | G06T 7/0081 345/424 |
| 2008/0118131 A1 | 5/2008 | Skinner et al. | |
| 2008/0187201 A1* | 8/2008 | Liang | G06K 9/00201 382/131 |
| 2008/0240564 A1* | 10/2008 | Sun | G06K 9/342 382/175 |
| 2008/0260221 A1* | 10/2008 | Unal | G06K 9/342 382/128 |
| 2008/0260222 A1* | 10/2008 | Kumar | A61B 6/032 382/128 |
| 2008/0292153 A1* | 11/2008 | Binnig | G06T 7/0012 382/128 |
| 2008/0292169 A1* | 11/2008 | Wang et al. | G06T 7/0012 382/128 |
| 2008/0298662 A1* | 12/2008 | Periaswamy et al. | 382/131 |
| 2009/0136096 A1* | 5/2009 | Sirohey | G06T 7/0012 382/128 |
| 2009/0238431 A1* | 9/2009 | Peterson et al. | 382/131 |
| 2010/0054525 A1* | 3/2010 | Gong | G06K 9/6206 382/100 |
| 2011/0026797 A1* | 2/2011 | Declerck | G06T 7/0012 382/131 |

OTHER PUBLICATIONS

Hong et al. "Combining Topological and Geometric Features of Mammograms to Detect Masses," Proc. of Medical Image Understanding and Analysis, Londons (2004).

* cited by examiner

METHOD AND APPARATUS FOR IDENTIFYING REGIONS OF INTEREST IN A MEDICAL IMAGE

BACKGROUND OF THE INVENTION

1. Field of the Invention

The present invention concerns identifying regions of interest in medical images of a subject.

2. Description of the Prior Art

The definition of regions or volumes of interest (ROI/VOI) is a typical precursor to quantitative analysis of medical images, such as nuclear medicine emission images (for example, PET or SPECT). Such regions may be defined around areas of high intensity which correspond to high tracer uptake (hotspots). For example, in FDG-PET images for oncology, such areas may be indicative of the presence of a tumor. Oncology physicians frequently annotate lesions in PET scans for the purpose of making a diagnosis, or for use in radiotherapy. The mean or maximum tracer uptake can aid a reader in determining the likelihood of cancer. In longitudinal studies, considering the change in intensity or uptake on corresponding VOIs from images at different temporal stages may be used to determine whether a tumor has regressed.

The ROI/VOI delineation step is generally a user interactive process. In PET, it is common to define such regions using a manually adjusted threshold either defined on an absolute scale or with reference to a local maximum in intensity, or some other reference region.

The issue in such threshold based segmentations is the adjustment of the threshold. It should be adjusted such that the object of interest is included in the VOI but such that the background is not. In some cases this adjustment is made difficult by the presence of other high uptake structures or features of the image adjacent to the region of interest. For example a lung tumor may be close to the heart left ventricle, a site of typical high uptake in FDG-PET. Alternatively, there may be several tumors in close proximity to one another and the user may wish to delineate each separately.

The difficulty is more pronounced in 3D than in 2D since the user must check each slice over which the VOI is defined, since connectivity between voxels included in the object of interest may be present across voxels not in the current displayed slices. This can be slow and laborious.

Previously considered methods of hotspot identification or lesion annotation include the following:

Local Threshold & Connected Component Method: a containing region, surrounding a particular hotspot, is selected and a threshold is chosen to select those voxels within the region corresponding to the lesion. The threshold is used to apply a Boolean inclusion criterion to each voxel within the region and the locations of the included voxels are stored in an annotated region. Optionally, a final step to label islands of included voxels individually may be applied, all or some of which may be accepted by the user as valid annotated regions. The problems with this approach are:

- the speed of the algorithm depends on the size of the containing region, and can be too slow for real-time feedback for larger regions
- if the original containing region excluded part of the annotated region (for example on a different slice of the volume) it will need to be redrawn and the process repeated
- multiple user interactions (e.g. mouse clicks) are required (for example, to create the containing region and update the threshold value)

Watershed method: a point is selected and expanded until an intensity threshold is reached, defining an annotated region. The threshold is used as a termination criterion of, for example, a watershed type algorithm. Although this method has a simpler user interface, it is also problematic since very permissive thresholds could potentially select most of the voxels within the image making the algorithm slow. The slowness occurs because the algorithm's speed is dependent on the number of voxels included in the final ROI. Two separate actions are required of the user: selecting the initial seed-point, then updating the threshold until the annotated region is acceptable (until it has segmented a lesion correctly).

Global Threshold & Connected Component Method: a global threshold may be applied to the image, where only voxels above the threshold are included. The sub-region surrounding a lesion is then selected. This algorithm can be slow and requires several inputs from the user. This is essentially the same as the Local Threshold and Connected Component Method, except the containing region is the entire image.

Manually segmenting out a region in the image: this can be very time-consuming if there are many lesions to be annotated or if the lesion covers multiple slices.

Automatic systems for selecting VOIs exist but these typically generate spurious regions which must be rejected. Those remaining typically require individual manual adjustment as well.

Many of these methods may be launched from a determined bounding region in the image data. To prevent the inclusion of extraneous structures that are within close proximity to an ROI/VOI, a user can manually define a sufficiently small bounding region that takes the form of a box or an ellipse. The threshold operation is defined only within this outer region. This works in some cases but is difficult and sometimes impossible in others. For example, in some cases this may not be possible, as shown for a 2D example in FIG. 1, where a box is used to define the bounding region.

Figure 1:
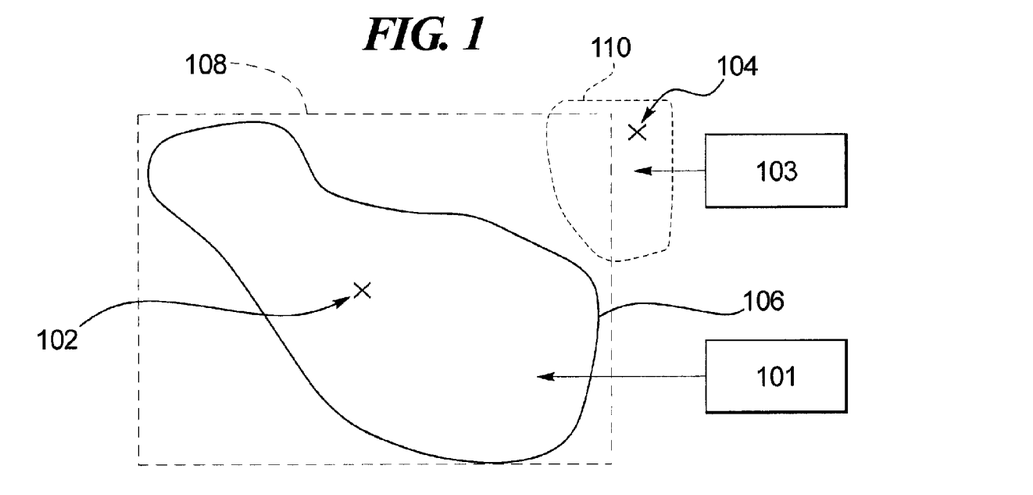
FIG. 1 shows a cropped image taken from single PET slice.

FIG. 1 is a diagram showing a cropped image taken from a single PET slice. In the image there are two maxima 102, 104 indicated by the two crosses. The region of interest 101 to the user is indicated by the solid freeform curve 106 in the image, and the bounding region is indicated by the dashed rectangle 108. An additional region 103 that is included by the box is indicated by the dotted freeform curve (110).

The region the user is interested in (the ROI 101) is shown as a solid freeform curve. If the box 108 in FIG. 1 is made too small, then part of the ROI will be excluded. Alternatively, if the box is too large then parts of another region 103 will be included within the box. In 3D, only one slice may be in view at a time, so the user may not even be able to tell if extraneous structures have been included without inspecting each slice individually. One solution to this problem is to apply a connected component algorithm to separate the two regions within the bounding region. The user may then indicate which potential ROI should be rejected. Every time the threshold is changed, the connected component algorithm needs to be re-applied.

However, this solution will be effective only if the user selects a threshold such that the two structures are indeed spatially disconnected. This requires that the user adjusts the threshold and then inspects the resulting segmentation to determine if the desired result has been obtained.

Alternatively, the user may define a bounding region by delineating a set of free form curves in 2D: one curve for each slice of the scan. This can be a time consuming process. In addition, the changes in shades of intensity may be too subtle for the user to tell if extraneous nearby structures have inadvertently been included within the delineated bounding region.

SUMMARY OF THE INVENTION

The present invention aims to address these problems.

In general terms, the invention encompasses a method for identifying a region of interest in a medical image of a subject, including obtaining a list of voxels of the image sorted according to a first variable; registering a user-selection of an initial voxel in the image; and selecting, as a region of interest, at least one voxel from the sorted list according to a property of said at least one voxel in relation to the user-selected initial voxel.

This method allows the user to define easily ROIs and VOIs with a single selection of a voxel.

The method can further include pre-processing the image to generate the list of voxels of the image sorted according to the first variable; and following generation of the list, registering the user selection of the initial voxel.

This allows the selection step to be performed at speeds far greater than in previously considered methods.

The method may further include determining a value of the first variable for the user-selected initial voxel; and selecting as the region of interest a group of voxels from the list having values for the first variable equal to or higher than that for the user-selected initial voxel.

Preferably, each voxel of the group is adjacent to another voxel of the group, and any pair of voxels of the group is connected by a path of adjacent voxels of the group. Suitably, the step of pre-processing the image includes pre-processing to generate multiple sets of voxels, the voxels of each set sorted according to a first variable, and arranging the sets of voxels in a hierarchy as a function of the first variable.

More preferably, the method further includes following the generation of the sets, registering the user selection of the initial voxel; determining an initial one of the sets which includes the initial voxel; and selecting as the region of interest: i. a subset of the initial set of voxels containing those voxels having values for the first variable equal to or higher than that for the user-selected initial voxel; and ii. any other sets having a minimum voxel value for the first variable equal to or higher than that for the user-selected initial voxel, and having at least one voxel adjacent to a voxel of the subset.

Advantageously, the multiple sets of voxels are generated by a connected-component algorithm.

In another embodiment, the step of obtaining the list of voxels of the image sorted according to the first variable includes determining a set of candidate regions of interest in the image; and determining a hierarchy among the set of candidate regions according to a first variable.

This provides a simple and clear delineation of candidate regions of interest for the user.

Preferably, the step of selecting at least one voxel from the sorted list comprises: selecting at least one region from the hierarchy according to a property of said at least one region in relation to the user-selected voxel. More preferably, the at least one region selected includes the region closest to the user-selected voxel.

Suitably, each candidate region is associated with a local maximum value for the first variable, and the at least one region selected is at least one region associated with the closest local maximum value to the user-selected voxel.

Advantageously, the at least one region selected includes the user-selected voxel. Suitably, the step of selecting further comprises selecting a set of regions, the method further comprising allowing a user to select at least one region from the set.

The method may further comprise: determining a subset of candidate regions of interest from the set of candidate regions; determining a hierarchy among the subset of candidate regions; and selecting at least one region from the subset hierarchy. This allows a further selection of a subset candidate region, for example at a finer resolution.

Advantageously, the step of selecting at least one region further includes determining a region with a highest lesion likelihood.

Suitably, the hierarchy of candidate regions is generated by a connected-component algorithm.

In yet another embodiment, the method further includes identifying multiple sets of voxels of the image, each set associated with a local maximum value for the first variable; determining a first set of voxels associated with the local maximum value closest to the user-selected initial voxel; determining a second set of voxels associated with a second local maximum value; and excluding the second set of voxels from a region of interest for the user-selected voxel.

This allows a selection of an ROI which prevents the inclusion of another region which is not relevant for the user.

The step of excluding may further include setting as a maximum boundary of the region of interest an isocontour through voxels of substantially the same value for the first variable, said isocontour surrounding the first set of voxels.

Suitably, the second set of voxels includes a second local maximum value voxel, and the maximum boundary is that isocontour at the minimum value for the first variable without the isocontour surrounding the second local maximum value voxel.

Preferably, the multiple sets of voxels of the image are each associated with a local maximum value for the first variable, is generated by a connected-component algorithm.

In embodiments of the invention, the first variable is an intensity value.

In another embodiment of the invention, a method for identifying a region of interest in a medical image of a subject, the image captured by a medical imaging apparatus, includes obtaining, by a processor, a list of voxels of the image sorted according to a first variable; registering, by a processor, a user-selection of an initial voxel in the image; selecting, by a processor, as the region of interest at least one voxel from the sorted list according to a property of said at least one voxel in relation to the user-selected initial voxel; and displaying the selected region of interest in the image or a display device.

The invention also encompasses an apparatus for identifying a region of interest in a medical image of a subject, the image being captured by a medical imaging apparatus, including a processor that obtains a list of voxels of the image sorted according to a first variable; registers a user-selection of an initial voxel in the image; and selects, as the region of interest, at least one voxel from the sorted list according to a property of the at least one voxel in relation to the user-selected initial voxel; and a display device that displays the selected region of interest in the image.

The invention also encompasses a computer-readable medium encoded with program code that, when loaded into or run on a computer, cause the computer to execute a method as described above.

DESCRIPTION OF THE PREFERRED EMBODIMENTS

The following terms are used herein, defined as:

PET—Positron Emission Tomography, a method for imaging a subject in 3D using an ingested radio-active substance. Typically the image shows biological function.

ROI—Region of Interest

VOI—Volume (Region) of Interest

ICC—Iterative Connected Component algorithm

CT—Computer (Aided) Tomography, a method for imaging a subject in 3D using X-Rays. Typically the image provides anatomical information.

Threshold—a particular intensity value within an image, often above or below which all pixels or voxels are accepted for a process or algorithm.

Delineate—select a boundary within which all voxels are distinguished from the surrounding voxels.

Embodiments of the present invention address the problem of identifying regions of interest in medical images, for example, in annotating lesions. Common to all embodiments are the steps of obtaining a list or hierarchy of voxels (or groups of voxels) of the image sorted in some way, for example according to intensity (such as SUV value for an FDG-PET scan). A user then selects an initial voxel, and a group of (at least one) voxels from the sorted list or hierarchy is selected as a region of interest, according to some property of this group in relation to the user-selected voxel.

Typically, the list or hierarchy is obtained by pre-processing the image. In embodiments of the invention, this pre-processing is done using an iterative connected component (ICC) algorithm. An algorithm on which this ICC algorithm is in part based was introduced by Matas (Matas et al, *Robust Wide Baseline Stereo from Maximally Stable Extremal Regions*, Proc. Of British Machine Vision Conference, 2002). Variants have been implemented by Hong (Hong et al, *Combining Topological and Geometric Features of Mammograms to Detect Masses*, Proc. Of Medical Image Understanding and Analysis, London, September 2004.) amongst others.

In embodiments of the invention, the pre-processing operates by sorting the intensities in the image into descending order. The sorted list of intensities is traversed; the first voxel is labeled as the first local maximum, and the second, if not a neighbor of the first voxel, is labeled as a second local maximum. Thus those locations that currently have no neighbors form new labels (each label is associated with one local maximum) and those adjacent to labeled voxels take the (adjacent) label with the highest maximum.

Merges are recorded; if a voxel is connected by neighbors to both (for example) the first and second maxima, it is labeled as such. The output of the algorithm is: a label image, an intensity sorted list of voxels and a list of merges and a list of starting points.

Some advantages of using the ICC method in this way over previous approaches are:

The interface is simple (only one click may be required, depending on the exact embodiment and the region required)

The algorithms are sufficiently fast to provide real-time feedback no matter how low the intensity threshold (even for 3D data)

The algorithm pre-processing is brief enough not to impede the useful interpretation of the results. For example, on a typical workstation, the pre-processing takes only around 1.5 s on a typical 11 mega-voxel PET scan.

The speed of the methods used arise from their use of the intensity sorted list of voxels, which is fixed during pre-processing and only requires one pass to establish the structure which allows voxels or region of interest to be highlighted.

Previously considered algorithms either required the entire scan to be traversed with the current threshold, or required the locations of the local maxima to be computed anew every time the algorithm was used followed by iterative traversals of a list of highlighted voxels.

It should be noted that the methods described are not restricted to the ICC algorithm, although with current technology this appears the most generally applicable. For example, a watershed-type algorithm could be used for the same purpose, given sufficient advances in computer technology giving speed improvements sufficient for real-time performance (or restriction of the problem, for example by limiting the maximum size of the region segmented).

As noted above, the structure generated by the ICC algorithm can be used to, for example, automatically generate thresholds in a number of embodiments.

Figure 2:
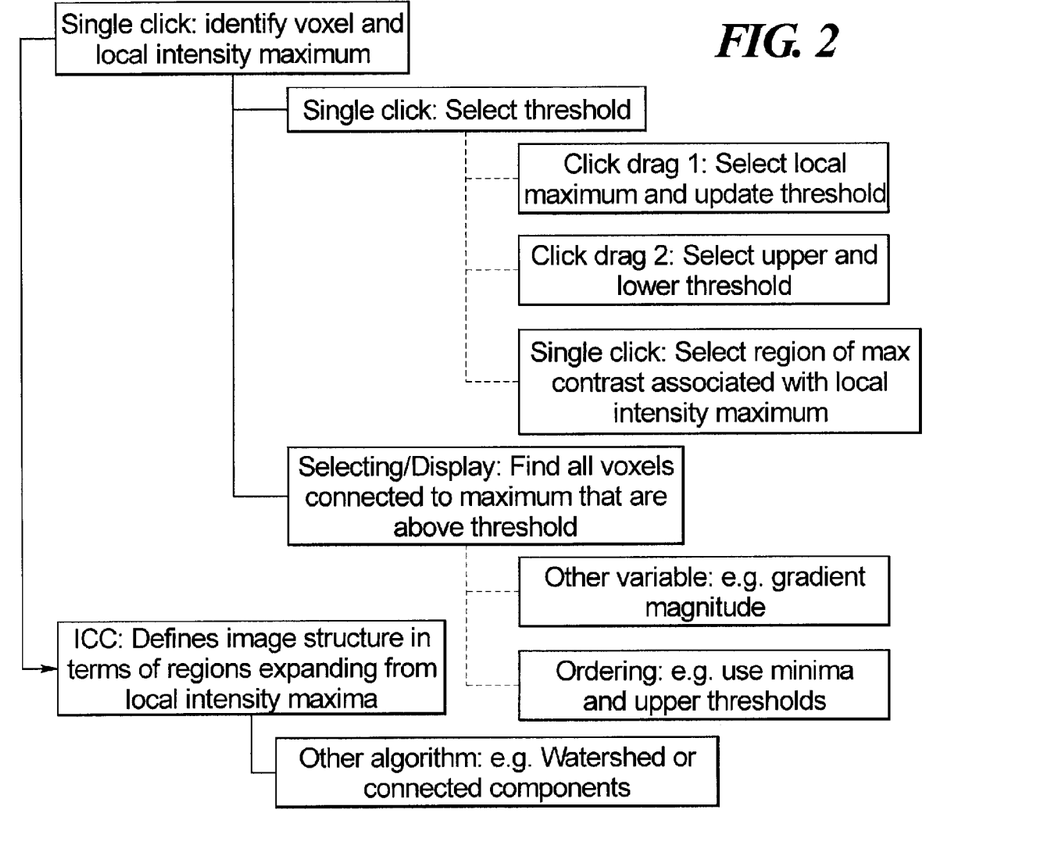
FIG. 2 illustrates a process for identifying a region of interest, according to an embodiment of the invention.

FIG. 2 sets out the processes which are generally involved in a first embodiment of the invention. A threshold (of intensity, for example of SUV values in an FDG-PET scan) is determined from the point in the image that the user clicked on (rather than requiring a separate step to update the threshold), and the corresponding click-label is extracted from the label image, that is, which local intensity maximum is the point associated with. Next, the position of the click-point in the sorted list of voxels is found. All voxels in the intensity sorted list up until this point that correspond to the click-label are extracted. Likewise the voxels of any child-labels that have merged into the click label up until this point are extracted and stored. The collection of voxels is then highlighted.

Figure 3:
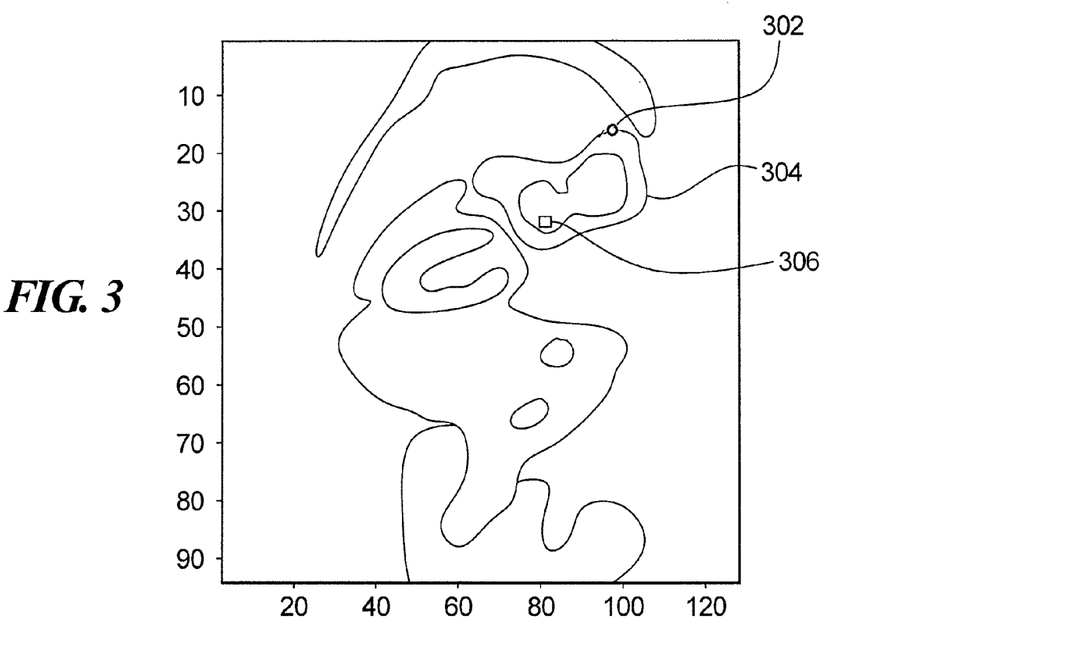
FIGS. 3 and 4 illustrate annotations according to embodiments of the invention.

An example of the output of this process is shown in FIG. 3, which shows a coronal slice from a PET scan of a human torso. The circle 302 indicates a user click point and the black curve 304 indicates the annotated region of interest in the image that results. The square 306 indicates the largest local maximum in the region.

Variations on this basis process can be followed. For example, an upper and a lower threshold may be selected by clicking and dragging the mouse. The locations of two voxels are used in this case, the voxel at the click point and the voxel at the release point. The voxel corresponding to the higher intensity is used as an upper threshold and the other voxel used as a lower threshold. Only voxels between these two thresholds are highlighted as the region of interest. Two separate user "clicks" can be used for the same operation.

Figure 4:
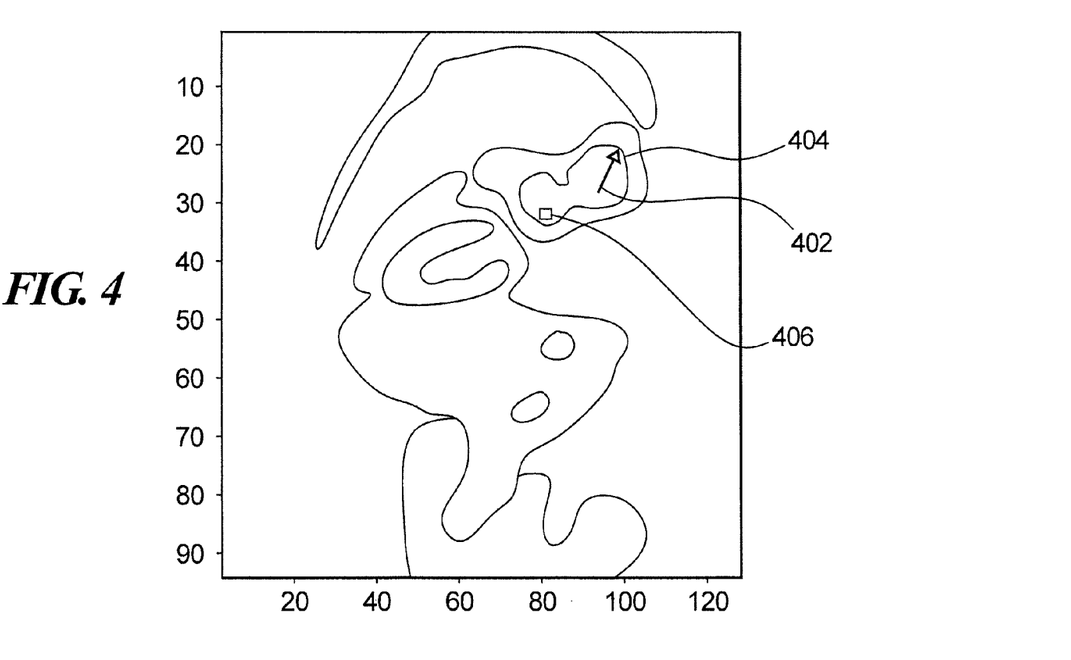

In an alternative, a click-drag approach may be used to fine tune the size of selected region. The initial click selects the initial point from which the region "grows". The point under the mouse cursor (while dragging) gives the threshold to use for the region. The region segmented is updated in real-time, allowing fine-tuning by the user. An example of this is shown in FIG. 4: the tail 402 of the arrow shows the first click point and the head 404 show the current position of the mouse cursor while being dragged. The square 406 shows the largest local maximum in the region.

The regions of interest can of course be associated with local cold-spots (rather than hot-spots) and grown from local intensity minima. Images of variables other than intensity may be used, e.g. gradient magnitude images and distance transforms. For example, the process can return the region of maximum contrast associated with the selected local intensity maximum.

Intensity display boundaries may be selected, also by clicking and dragging between two points in the image. The color map of the display could be adjusted to optimally display the region that would be selected using the thresholding method described above (click-and-drag).

For adjusting the threshold, iso-intensity contours surrounding the highlighted regions may be shown so the user can see where to click (or drag to) to adjust the region. By pressing a key (e.g., the spacebar) a magnified view near the edge of the contour may be displayed to allow the choice of threshold to be fine-tuned. This technique could be used in addition to the click-and-drag method, where the region selected can be made overly sensitive to mouse movement in regions densely populated with intensity contours.

When viewing multi time-point data it is often useful to copy annotations from one frame of data to another. However since registrations between time-points are seldom exact, the copied region usually requires adjustment. In an embodiment of this invention, instead of copying the region directly, the seed-point of the region in time-point 1 is transformed to time-point 2 and then treated as a seed-point for that time-point. The new region is then expanded until the threshold was the same as that in time-point 1. Using the output of the ICC algorithm this operation is sufficiently fast for real-time performance, i.e., selected regions can be updated and displayed in both images at the same time while the user fine-tunes the result using only one click/drag operation.

In an alternative the "hottest" voxel in the region is copied from time-point 1 to time-point 2, rather than the user seed-point; this may give more reliable results if substantial changes in the tumor occur.

Figure 5:
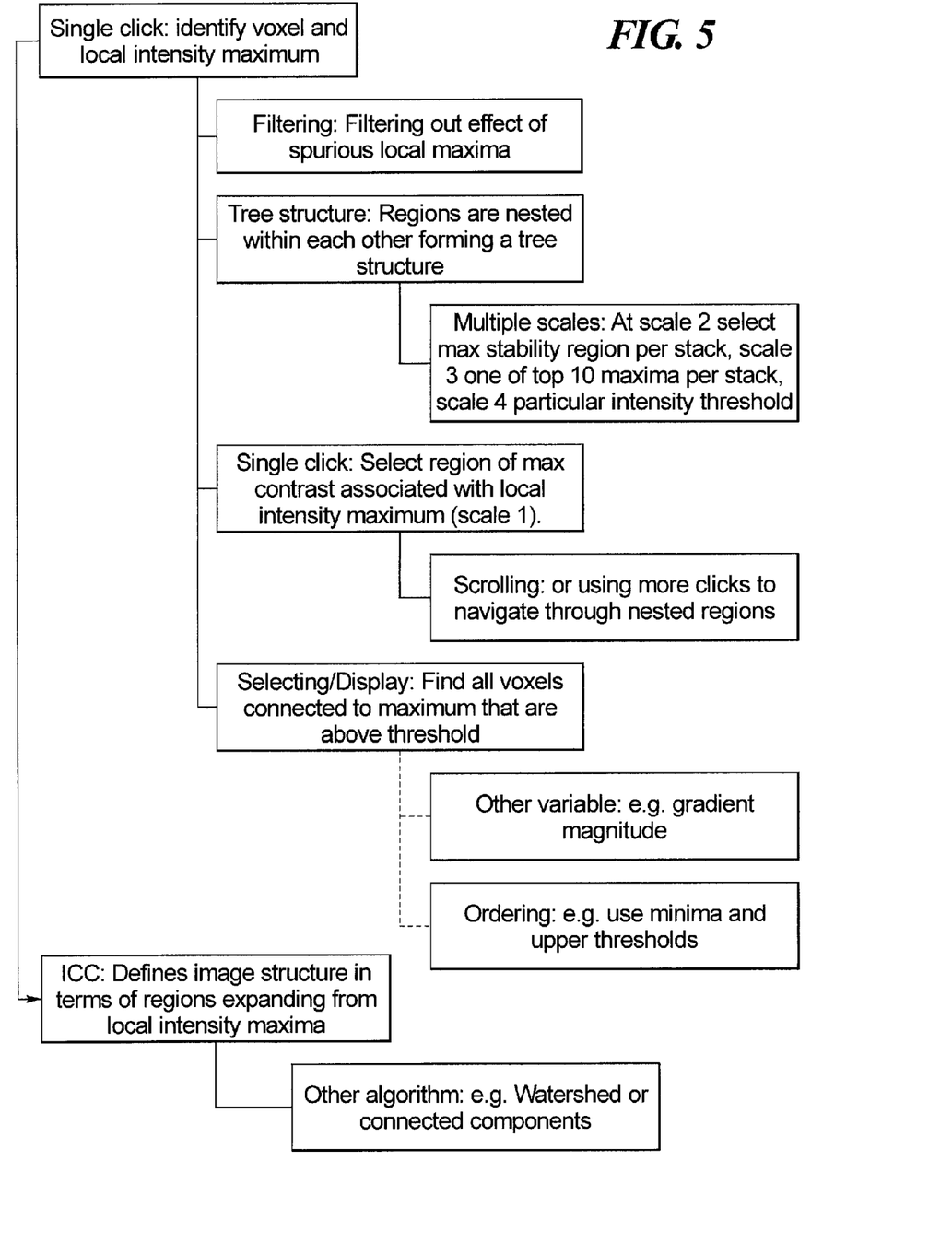
FIG. 5 illustrates a process for identifying a region of interest, according to an embodiment of the invention.

FIG. 5 sets out the processes generally involved in a second embodiment of the present invention. The hierarchy or tree structure of the result of the ICC pre-processing is used to detect a set of candidate regions or volumes of interest (VOIs), whose relationships are encoded by the hierarchical grouping. At least two kinds of relationships can exist: one VOI can encompass another, and two VOIs can merge. These relationships are established using a variable such as intensity, or gradient magnitude.

A subset of VOIs is obtained to be presented to the user, which is also arranged as a set of tree structures. Such a subset may, for example, consist of those VOIs with the greatest contrast of intensity relative to the surrounding area, since these are deemed likely to be of interest. The user may then choose to accept some or reject others in a final group of VOIs. Alternatively, it may be possible that none of the selected subset of VOIs is sufficiently accurate in the user's judgment. In this case, the user can pick one VOI that is the closest to that desired and request that the system display other significant VOIs that are more closely related using the first hierarchy of VOIs. Even though fewer VOIs may exist in the second hierarchy, too many will likely exist to present to the user practically. Hence the some of the VOIs may need to be filtered out using rules based on size and location.

The first set of VOIs and the subset form two different hierarchies of VOIs, which are at different scales or resolutions. Additional scales and associated hierarchies based on contrast or other variables can be used to navigate through the possible VOIs.

In a particular example of delineating an oncological PET scan, the following approach may be used to implement the above system. First, a tree is generated using the output of an ICC algorithm. The tree structure represents the VOIs resulting from a set of threshold values applied to the image data; for example, a series of set threshold values may be used, and these are the points at which a new region of interest or VOI is recorded. Each VOI is also a connected component, i.e., the voxels that are above the particular threshold are adjacent to one another. The set of thresholds may represent all possible voxel values in the image.

Figure 6:
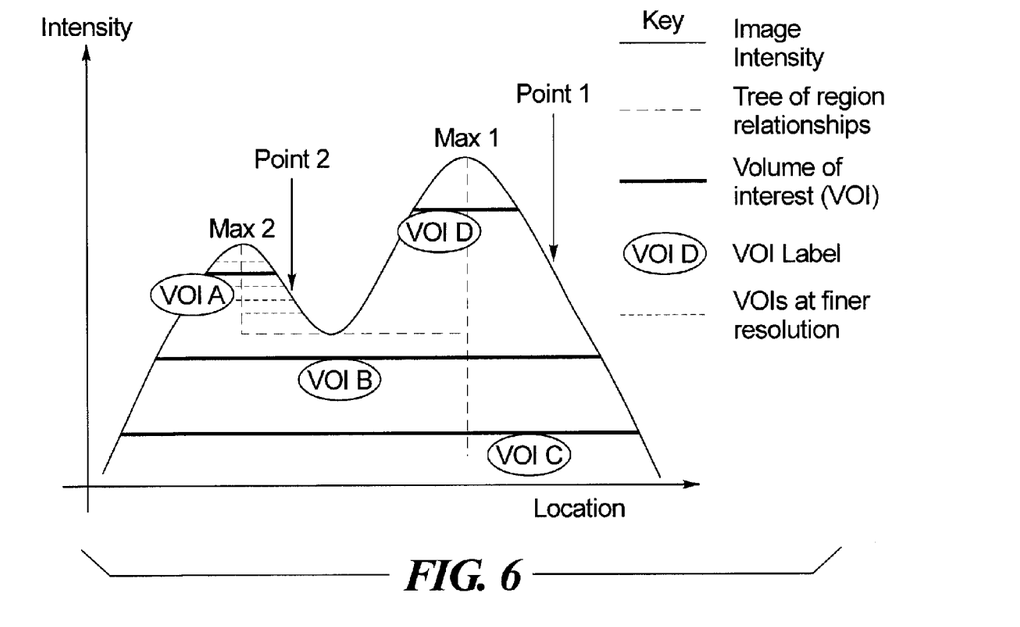
FIG. 6 illustrates a hierarchy structure according to an embodiment of the invention.

A subset of the VOIs in the tree can be selected by measuring features related to lesion likelihood. Examples of such features include mean uptake, maximum uptake, and contrast. In such a representation, one or more of such VOIs may be associated with a particular local maximum. This structure may be used to rapidly navigate the regions in the image. A simple example of such a structure for a 1D image is shown in FIG. 6, a 1D analogue of a 3D image showing how regions (volumes) are arranged into a hierarchy, composed of two maxima (Max 1, Max 2) and four VOIs A, B, C and D. VOIs are shown as a bold line (indicating a set of locations) and a nearby ellipse (indicating the VOI label).

When the user clicks on a location, the nearest significant maximum within the hierarchy is selected. The maximum is associated with a subset of VOIs on a single path segment through the tree. For example in FIG. 6, point 1 is associated with maximum 1, which in turn, is associated with VOIs: B, C and D. Initially, the VOI within the path segment with the highest corresponding lesion likelihood is selected. For click point 1 in FIG. 6, this may be VOI B, say. At this point the user may decide that they prefer a differently sized VOI so the user can scroll up to select VOI D or down to select VOI C.

If the user clicks at point 2, VOI A is selected, as this is the only VOI associated with max 2. However the user may still scroll down to select VOI B or C. The selection remains bound to the originally selected maximum, so scrolling up returns the user to VOI A rather than VOI D. If required, the user may request a finer selection of VOIs, for example the VOIs shown with dotted lines near VOI A.

Figure 7:
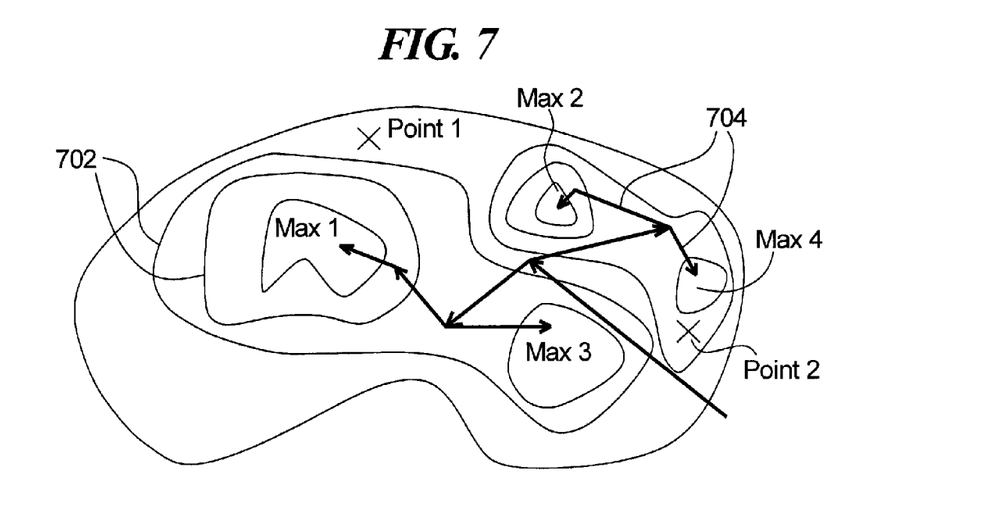
FIGS. 7 to 9 illustrates regions of interest in hierarchies, according to an embodiment of the invention.

A 2D example with four local maxima (Max 1, Max 2, Max 3, Max 4) is shown in FIG. 7. For clarity, the set of VOIs within the tree are shown (as contours, 702) rather than image intensity. The tree structure between the regions is shown by the arrows (704). Two click points (point 1, point 2) are indicated by crosses.

Figure 8:
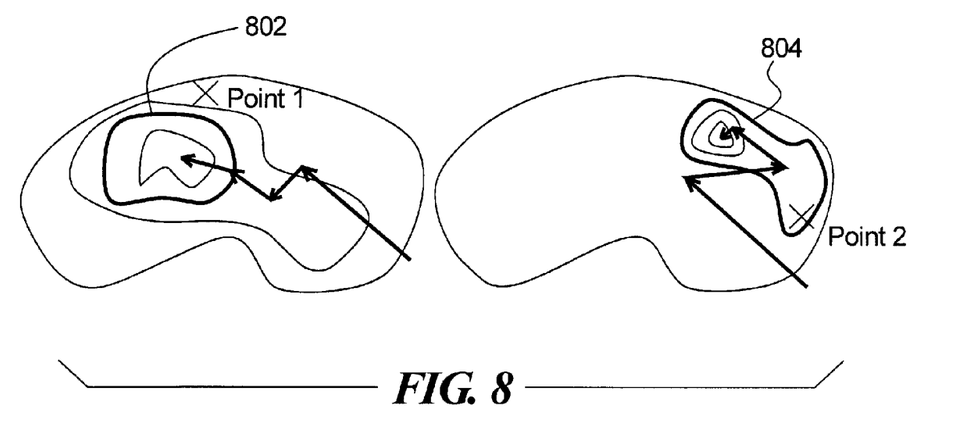

Depending on the click point a different subset of VOIs will be selected for the user to scroll through. The subsets of VOIs in FIG. 7 associated with the two click points Point 1 and Point 2 are shown in FIG. 8, parts (a) and (b). The subset of regions that may be traversed is dependent on the click point. The VOI with the highest lesion likelihood is shown with a bold boundary (802, 804). This is the VOI within the respective subset that is shown first.

Figure 9:
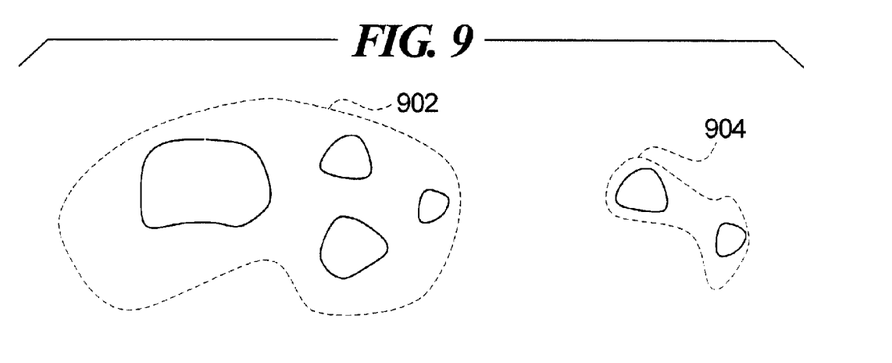

So far, a workflow where only one VOI was shown per click point has been discussed. The user would be required to click on a second point to specify another VOI. In some cases, the clinician may prefer to indicate to the system that the current region should be treated as two separate VOIs. In this case, if two (or more) local maxima exist within the currently selected VOI, the VOI is replaced with the VOIs with the highest lesion likelihood that do not overlap. Two examples of such an operation are shown in FIG. 9, where the initial region 902, 904, before the split operation, is indicated by the dotted line In summary, the above second embodiment sets out another method for rapidly delineating VOIs in medical images. In its most basic form, the method involves obtaining a set of good choices for VOIs (from the set of all possible VOIs) and organizing these into a hierarchy. A mouse click causes a particular path within the tree to be chosen and a mouse scroll allows alternative VOIs within the path to be selected and displayed. An existing VOI may be split into a set of smaller multiple VOIs associated with different maxima.

Some alternative display and navigation strategies are applicable. For example, in one embodiment initially no VOIs are displayed to the user. When the user clicks on location in the image the entire set of significant VOIs that are nearest to that click point are displayed, including different branches within the hierarchy of VOIs. The user is able to see where to click in order to navigate to other nearby VOIs.

In another embodiment, the system displays the hierarchy of VOIs associated with the image using a graphical display superimposed in the PET scan.

The system may organize the VOIs in the hierarchy such that multiple subsets of VOIs are created. In the above examples, the algorithm chooses only one subset of significant VOIs for the user to navigate. Generating multiple subsets will allow the user to choose to navigate the possible VOIs at different levels of detail. The final level may in fact be the full set of thresholded and connected VOIs.

The system may display all the regions associated with the current maximum in different hues, with the currently selected region from this subset highlighted by increasing its relative intensity or by highlighting the border of the currently selected VOI.

Rather than requiring the user to click to select a maximum, a possible region choice can be shown when the user hovers the mouse cursor over a particular point. A click is used to accept the current region or to begin traversal of the VOI tree.

Of course, a system based on selecting cold-spots associated with minima could be created. In addition other images could be used e.g. gradient magnitude or distance functions.

Figure 10:
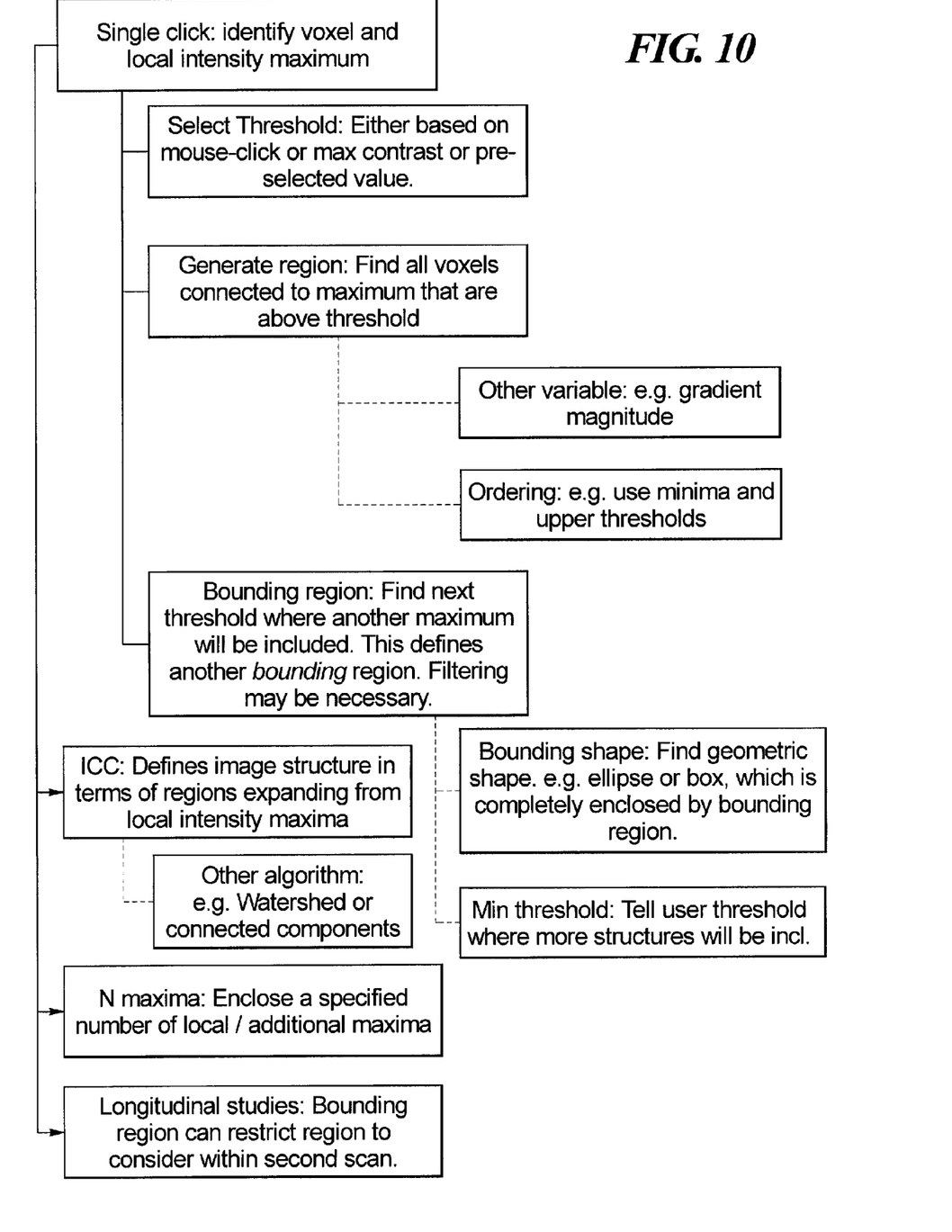
FIG. 10 illustrates a process for identifying a region of interest, according to an embodiment of the invention.

FIG. 10 sets out the processes which are generally involved in a third embodiment of the invention. This embodiment allows a freeform bounding region to be generated that delineates the largest possible region that can be selected without including additional regions, features or structures in the image which are not of interest to the user. This is referred to as the maximal bounding region. A user need not carefully select a bounding region, but rather may select any threshold (restricted automatically by the bounding region as set out below) without fear of including an extraneous feature or structure within the ROI. In addition, a connected component algorithm may not need to be re-applied if the threshold is changed.

Figure 11:
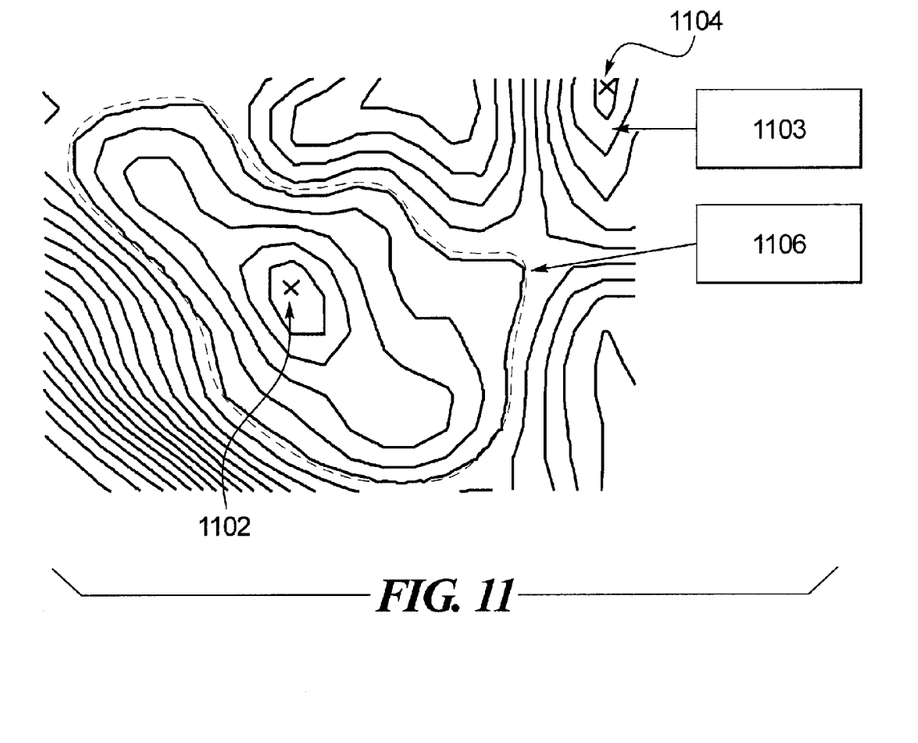
FIGS. 11 and 12 illustrate bounding regions according to embodiments of the invention.

An example of this is illustrated in 2D in FIG. 11, where the image is an isocontour representation of the image in FIG. 1. The isocontor representation is shown for convenience, since each isocontor represents a possible threshold selection from which an ROI may be obtained.

The bounding region is shown as a dashed freeform curve 1106. The bounding region includes only a single structure (such as a particular lesion in a PET image) corresponding to one maximum 1102. All ROIs are restricted to remain within the bounding region, whatever the threshold, thereby guaranteeing that only one PET structure is ever included in the ROI. The additional structure 1104, in which the user is not interested, is therefore excluded from the ROI.

The user may select any threshold; however thresholds below a certain value will have no further effect on the ROI, because the ROI is restricted to remain within the bounding region. The user or system can be informed of this minimum threshold.

In an embodiment, the image is processed using an ICC algorithm, which as shown above can identify all possible regions arising from all possible thresholds, and stores this information in a tree structure than can be efficiently indexed to determine connected regions rapidly.

This third embodiment then works by growing a region from the corresponding local maximum until a merge with adjacent structures (from the ICC algorithm results) is detected. At this point the process is stopped and the bounding contor or surface is recorded or the threshold at which this occurs is stored.

Figure 12:
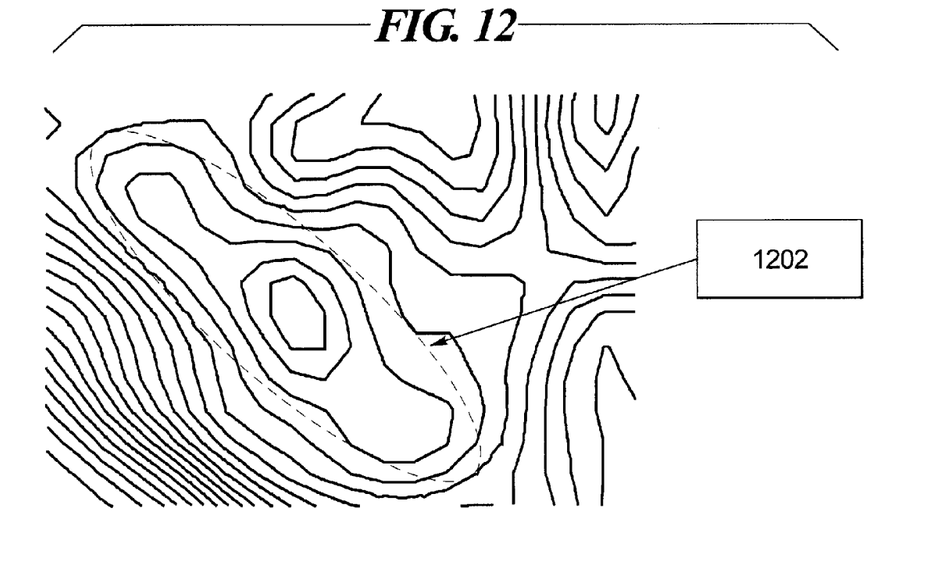

Some platforms may not allow the use of freeform curves to define a bounding region. In this case a geometric primitive may be used as a bounding region such that any threshold may be used without fear of including additional structures. Again, this is computed automatically. The primitive may take one of several forms such as a box, axis aligned ellipse or rotated ellipse. In FIG. 12, an example of a rotated ellipse 1202 being used as a 2D bounding region is shown.

In a longitudinal study, a clinician may want to select a region within a second PET scan that is shared with the first scan, but includes only a single structure within the first scan. The maximal bounding region from the first scan may be used to restrict the permissible region of selection within the second scan. This will allow the user to select the threshold bounding a region in the second scan more appropriately or tell more easily what changes within the patient have occurred. In addition, the application could indicate to the user when the border of the maximal bounding region has been impinged upon by the ROI. This could indicate tumor growth, for instance.

When viewing a MIP (maximum intensity projection), the maximal bounding region may be used to mask out voxels which are outside of the bounding region (i.e., irrelevant), so that other structures do not obscure the ROI currently under consideration. The mask may also be applied to the MIP of a second image within a longitudinal study for the same purpose. This aids in deciding whether a region of high uptake has shrunk or not.

In addition to showing the maximal bounding region for one local maximum, the user may desire to see the maximal bounding region that surrounds a specified number of local maxima. This is a straight-forward extension to the method described above.

Of course, this technique could be applied to intensity minima rather than maxima, to select regions that exclude other cold-spots in the image. This technique may also be applied to other types of images, e.g., gradient magnitude images and distance functions.

Figure 13:
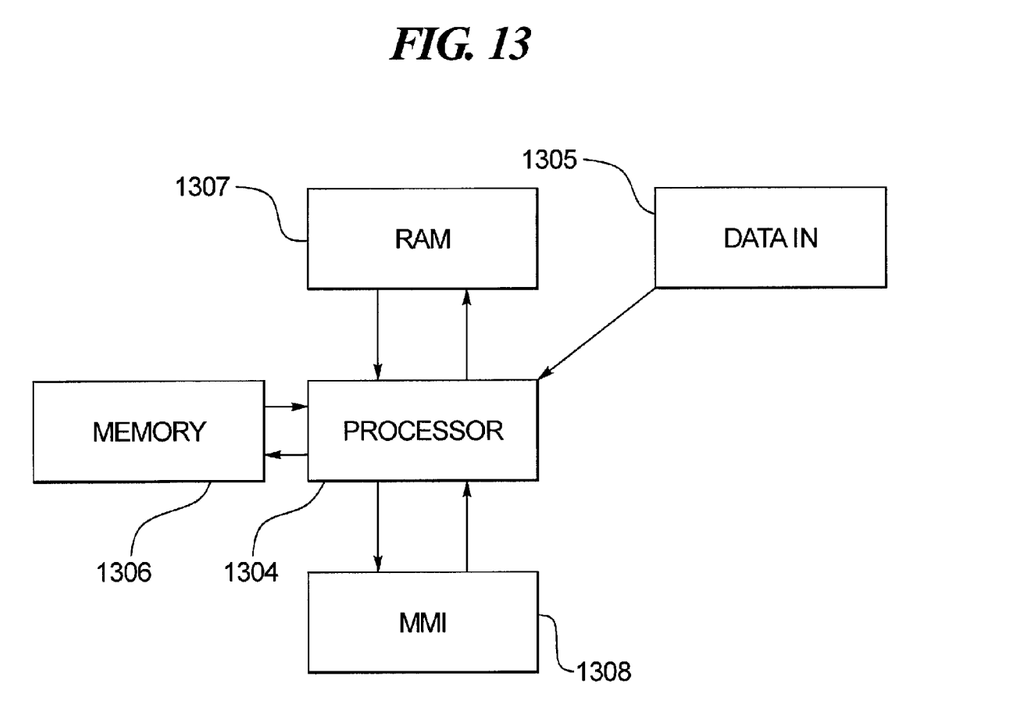
FIG. 13 illustrates an apparatus according to an embodiment of the invention.

Referring to FIG. 13, the above embodiments of the invention may be conveniently realized as a computer system suitably programmed with instructions for carrying out the steps of the methods according to the invention.

For example, a central processing unit 1304 is able to receive data representative of medical scans via a port 1305 which could be a reader for portable data storage media (e.g. CD-ROM); a direct link with apparatus such as a medical scanner (not shown) or a connection to a network.

Software applications loaded on memory 1306 are executed to process the image data in random access memory 1307.

A Man—Machine interface 1308 typically includes a keyboard/mouse/screen combination (which allows user input such as initiation of applications) and a screen on which the results of executing the applications are displayed.

Although modifications and changes may be suggested by those skilled in the art, it is the intention of the inventors to embody within the patent warranted hereon all changes and modifications as reasonably and properly come within the scope of their contribution to the art.

We claim as our invention:

1. A method of identifying a region of interest in a medical image of a subject, the method comprising:
   receiving, through a user interface of a computer, a medical image into said computer, said medical image of the subject comprising a plurality of voxels, with each of said voxels exhibiting an intensity;
   automatically executing, in said computer, a computerized algorithm stored in the computer to generate a hierarchy of said voxels of said image sorted in order of said intensity, with non-adjacent voxels labeled with a respective label as a local maximum or a local minimum of said intensity according to said hierarchy;
   receiving, after generating said hierarchy of voxels, a single user entry into said computer via said user interface, the single user entry designating an initial voxel in said image, said designated initial voxel exhibiting said intensity and label;
   defining, by said computer, for each label, a predetermined relationship of respective intensities of respective voxels by determining a numerical value of the intensity for the designated initial voxel;
   determining, by said computer, a set of candidate regions of interest in the image by selecting, for each candidate region of interest, a set of voxels from the sorted hierarchy with each voxel in said set of voxels having a numerical value for the respective intensity thereof that is equal to or higher than said numerical value of the intensity for the designated initial voxel,
   wherein said selecting, by said computer, said set of voxels is performed according to selection criteria requiring each voxel of said set of voxels to be adjacent to another voxel of said set of voxels, and
   wherein any pair of voxels in said set of voxels is connected by a path of adjacent voxels of the set of voxels;
   determining, by said computer, a hierarchy among the set of candidate regions of interest according to sorted hierarchy of said intensity;
   receiving, by said computer via said user interface, a user selection of at least one region of interest from said set of candidate regions of interest; and
   displaying, at a display device in communication with said computer, said selected at least one region of interest comprised of voxels from said stored hierarchy that respectively exhibit an intensity having the predetermined relationship, defined by the label of the designated initial voxel, to said intensity of said designated initial voxel.

2. The method of claim 1, the method further comprising:
   requiring, by said computer, the set to include the designated initial voxel; and
   selecting, by said computer, the region of interest further includes:
   i. selecting a subset of the set of voxels, said subset containing those voxels respectively having a numerical value for the intensity thereof that is equal to or higher than the numerical value of the intensity for the designated initial voxel; and
   ii. selecting any other sets of voxels having a minimum voxel numerical value for the respective intensity thereof that is equal to or higher than the numerical value of the intensity for the designated initial voxel, and having at least one voxel adjacent to a voxel of the subset.

3. The method of claim 1, the method further comprising:
   requiring, by said computer, the at least one region of interest selected by the user to include a region of interest closest to the designated initial voxel.

4. The method of claim 1, wherein each candidate region of interest is associated with a local maximum numerical value for the respective intensity thereof; and
   selecting, by said computer, the at least one region of interest as at least one region of interest associated with a closest local maximum numerical value to the numerical value of the intensity for the designated initial voxel.

5. The method of claim 1, the method further comprising:
   identifying, by said computer, a plurality of sets of voxels of the image, each set associated with a local maximum numerical value for the respective intensity thereof;
   determining, by said computer, a first set of voxels associated with the local maximum numerical value closest to a numerical value of the intensity for the designated initial voxel;
   determining, by said computer, a second set of voxels associated with a second local maximum numerical value for the respective intensity thereof; and
   excluding, by said computer, the second set of voxels from the region of interest.

6. The method of claim 5, the method further comprising excluding, by said computer, said second set of voxels by:
   setting, as a maximum boundary of the region of interest, an isocontour through voxels having substantially the same numerical value for said intensity, said isocontour surrounding the first set of voxels.

7. The method of claim 6, wherein the second set of voxels comprises a voxel having said second local maximum numerical value, and setting the maximum boundary to be an isocontour at a minimum numerical value for said intensity without the isocontour surrounding the voxel having the second local maximum value.

8. An apparatus for identifying a region of interest in a medical image of a subject, the apparatus comprising:
   a processor having an input configured to receive a medical image of a subject to said processor, said medical image of the subject comprising a plurality of voxels, with each of said voxels exhibiting an intensity;
   said processor being configured to automatically generate a hierarchy of said voxels of said image sorted in order of said intensity with respective voxels labeled with a respective label as a local maximum or a local minimum of said intensity according to said hierarchy;
   a user interface in communication with said processor configured to allow a user, after said processor has generated said list of voxels, to make a single entry into said processor that designates an initial voxel in said image, said designated initial voxel exhibiting said intensity and said label;

said processor being configured to define, for each label, a predetermined relationship of respective intensities of respective voxels by determining a numerical value of the intensity for the designated initial voxel;

said processor being configured to determine a set of candidate regions of interest in the image by selecting, for each candidate region of interest, a set of voxels from the sorted hierarchy with each voxel in said set of voxels having a numerical value for the respective intensity thereof that is equal to or higher than said numerical value of the intensity for the designated initial voxel, wherein said selection of said set of voxels is performed according to selection criteria requiring each voxel of said set of voxels to be adjacent to another voxel of said set of voxels, and wherein any pair of voxels in said set of voxels is connected by a path of adjacent voxels of the set of voxels;

said processor being configured to determine a hierarchy among the set of candidate regions of interest according to sorted hierarchy of said intensity;

said processor being configured to receive, via said user interface, a user selection of at least one region of interest from said set of candidate regions of interest; and a display device in communication with said processor, said processor being configured to cause said selected at least one region of interest, comprised of voxels from the sorted hierarchy that respectively exhibit an intensity having the predetermined relationship, defined by the label of the designated initial voxel, to said intensity of said designated initial voxel, to be displayed at said display device.

9. A non-transitory, computer-readable data storage medium encoded with programming instructions, said data storage medium being loadable into a processor having an interface, and said programming instructions causing said processor to:

receive a medical image of a subject to said processor, said medical image of the subject comprising a plurality of voxels, with each of said voxels exhibiting an intensity;

generate a hierarchy of said voxels of said image sorted in order of said intensity with respective voxels labeled with a respective label as a local maximum or a local minimum of said intensity according to said hierarchy;

receive, via a user interface, after generating said list of voxels, a manually entered designation of an initial voxel in said image, said designated initial voxel exhibiting said intensity and said label;

define, for each label, a predetermined relationship of respective intensities of respective voxels by determining a numerical value of the intensity for the designated initial voxel;

determine a set of candidate regions of interest in the image by selecting, for each candidate region of interest, a set of voxels from the sorted hierarchy with each voxel in said set of voxels having a numerical value for the respective intensity thereof that is equal to or higher than said numerical value of the intensity for the designated initial voxel, wherein said selection of said set of voxels is performed according to selection criteria requiring each voxel of said set of voxels to be adjacent to another voxel of said set of voxels, and wherein any pair of voxels in said set of voxels is connected by a path of adjacent voxels of the set of voxels;

determine a hierarchy among the set of candidate regions of interest according to sorted hierarchy of said intensity;

receive, via said user interface, a user selection of at least one region of interest from said set of candidate regions of interest; and generate a display of said selected at least one region of interest, comprised of voxels from the sorted hierarchy that respectively exhibit an intensity having the predetermined relationship, defined by the label of the designated initial voxel, to said intensity of said designated initial voxel, at a display device in communication with said processor.

* * * * *